Sept. 27, 1966 E. H. LANHAM 3,275,750
SIGNAL CONVERSION CIRCUIT FOR "E" AND "M" TELEPHONE LEADS
Filed Aug. 2, 1965
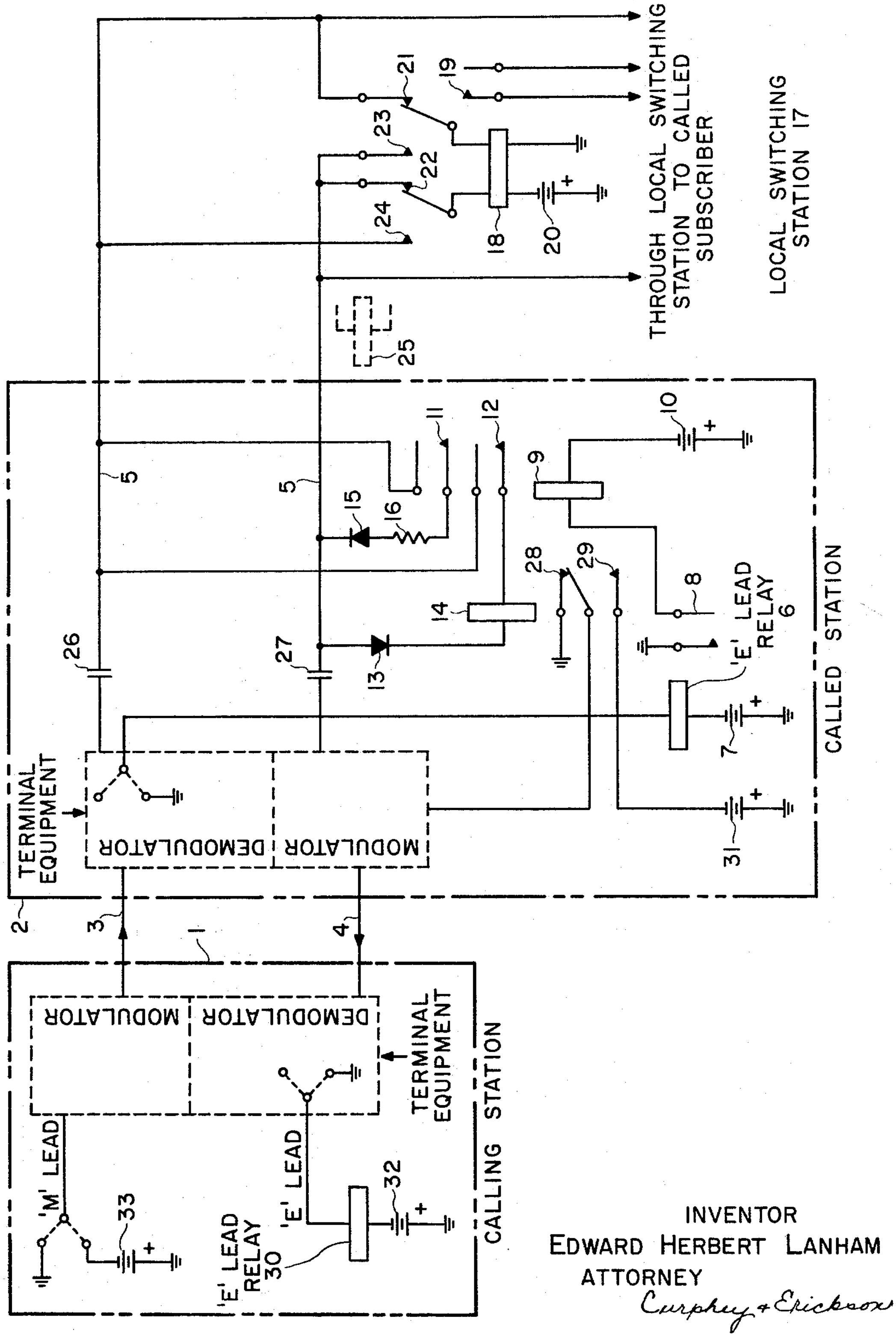
INVENTOR
EDWARD HERBERT LANHAM
ATTORNEY
Curphey + Erickson United States Patent Office 3,275,750

Patented Sept. 27, 1966

3,275,750

SIGNAL CONVERSION CIRCUIT FOR "E" AND "M" TELEPHONE LEADS

Edward Herbert Lanham, 1114 Field St., Ottawa, Ontario, Canada

Filed Aug. 2, 1965, Ser. No. 477,670
1 Claim. (Cl. 179—16)

This invention relates to conversion circuits for "E" and "M" telephone supervisory signalling systems. This application is a continuation-in-part of application Serial No. 188,397, filed April 18, 1962, now abandoned.

When a calling telephone subscriber whose telephone set loop circuit terminates at an office (herein designated as the calling station) wishes to call another subscriber whose loop circuit terminates at another office (herein designated as the called station), it is sometimes desirable that a supervisory signal be transmitted from the calling station to the called station in response to the recognition by the calling station that the calling subscriber wishes to make a call. In addition, it is also desirable that a second supervisory signal be transmitted from the called station to the calling station in response to the called subscriber lifting his receiver, i.e., operating his telephone hookswitch.

One of the common types of supervisory signalling systems is the "E" and "M" signalling system. "E" is the name given to the lead at a calling or called station which is used to receive signals sent from another station by the signalling circuit. "M" is the name given to the lead at a calling or called station which is used to apply signals to the signalling circuit for transmission to another station. Hence, both the calling and called stations will have an "M" and an "E" lead. Ground potential is normally connected to the "M" lead. When signalling is desired, battery is applied. The "E" lead is normally left open circuited, and is connected to ground when a signal from the signalling circuit is present. An "E" and "M" type signalling system is described in U.S. Patent to F. S. Entz, et al., May 4, 1954, No. 2,677,726, which relates to "N" type carrier systems.

When a call is originated at a calling station, battery is applied to its "M" lead to cause the terminal equipment to transmit a signal over the transmission path to the called station in a well known manner. Upon receipt of the signal, the terminal equipment at the called station is caused to apply a ground to its "E" lead which is interrupted in response to the dial pulses originating at the calling station. By means of a conventional conversion circuit, these pulses are converted into interrupted current flow in one direction in a pair of wires connected to the switching equipment so that the called subscriber's station can be selected. The switching equipment is also arranged to cause current to flow in the opposite direction in the pair of wires in response to the answering of a call at the called subscriber's station. The conventional conversion circuit converts the current flow in the opposite direction in the pair of wires into a battery supervisory signal applied to the "M" lead at the called station. This causes the terminal equipment to transmit a signal over the transmission path back to the calling station where a ground is applied to its "E" lead and the signalling cycle is completed.

Prior to my invention, such conversion circuits comprised auxiliary relays in the trunk and signalling circuits which tended to be expensive and which required considerable maintenance due to the number of moving parts. My invention provides a simpler conversion circuit than known prior art circuits which requires little maintenance.

According to my invention, I provide first switching means arranged to be alternately operated and released in response to the pulses applied to "E" lead. A first circuit means is connected across the pair of wires and is arranged to be energized and de-energized in response to the operation and release, respectively, of the switching means. In addition, this circuit means is arranged, when energized and de-energized, to permit current to flow, and to prevent current from flowing, respectively, in one direction in the pair of wires. This provides the interrupted current flow corresponding to the dial pulses originating at the calling station. A second circuit means is connected across the pair of wires and is arranged to be energized and de-energized in response to the operation and release respectively of the switching means. In addition, the second circuit means is arranged, when energized and de-energized, to permit current to flow, and to prevent current from flowing, respectively, in the opposite direction in the pair of wires. Second switching means is provided to be responsive to current flowing in the opposite direction in the pair of wires to connect a battery supervisory signal to the "M" lead.

The first switching means preferably can be a simple electromagnetic relay responsive to be alternately energized and de-energized by the pulses applied to the "E" lead. The first circuit means preferably comprises a first diode, a resistor and a make contact of the relay serially connected together across the pair of wires. The diode is poled to allow current to flow only in the one direction. Similarly, the second circuit means preferably comprises a second diode, the energization circuit of a second electromagnetic relay and a further make contact of the first relay. The second diode is poled to allow current to flow only in the opposite direction. The second switching means can advantageously comprise the transfer contacts of the second relay. Thus, when the second relay is energized, ground can be disconnected from and battery can be connected to, the "M" lead.

A better understanding of my invention may be obtained by referring to the following description taken in conjunction with the single drawing which illustrates a schematic circuit, partially in block form, of the preferred embodiment. In the interest of clarity only those elements necessary to describe my invention are illustrated in the drawing.

The drawing shows a calling station 1 connected to a called station 2 by first and second transmission paths 3 and 4 respectively. The calling station 1 and the called station 2 have within them terminal equipment comprising a modulator and demodulator, the modulator of the calling station 1 being connected via first transmission path 3 to the demodulator of the called station 2, and the modulator of the called station 2 being connected via second transmission path 4 to the demodulator in the terminal equipment of the calling station 1.

The terminal equipment shown in block form is described in the above-mentioned Entz, et al. patent as a modulator, carrier oscillator and keyer being the transmitting portion of the calling or called station; and as a demodulator and receiver being the receiving portion of the calling or called station. The received and transmitted signals are sent to and from the trunk circuits via "E" and "M" leads respectively.

As is well known in an "E" and "M" signalling system, a first source of fixed potential at the calling station 1 shown as battery 33 is connected to the "M" lead leading to the modulator in the terminal equipment of the calling station 1 when supervisory signals are to be generated. At other times ground is connected to this "M" lead.

The modulator changes the battery signal to a form which can be carried by transmission path 3 and then sends it along transmission path 3. In addition to the above-mentioned signals the modulator can apply voice signals and other pulses corresponding to dialed digits, etc. to transmission path 3. The signals on transmission path 3 are received at the terminal equipment of the called station and is demodulated by the demodulator.

The demodulated signal corresponding to that generated by the "M" lead in the calling station is converted to a ground which is applied to the previously open-circuited conductor shown as the "E" lead in the called station. As may be seen, when the "E" lead is connected to ground, the "E" lead relay 6 is energized due to the current flowing through the complete circuit which now appears from ground, through a second source of fixed potential 7, through the "E" lead relay, and back to ground as applied in the demodulator.

In this invention, a make contact 8 of the "E" lead relay 6 is connected to a relay 9, so that when the "E" lead relay 6 has operated, its make contact 8 will close, completing a circuit from ground through the springs of contact 8, relay 9, and third battery 10 back to ground, causing relay 9 to be energized and operate. The first switching means comprises relay 9 with its two make contacts 11 and 12. Relay 9 has been included because in many cases the already existing "E" lead relay does not have any spare contacts. However, it is realized that relay 9 could be left out and contacts 11 and 12 be operated by the "E" lead relay 6.

As is also well known in an "E" and "M" signalling system, local switching station 17 is connected via a pair of wires 5 to the called station. In this invention, first and second circuit means are connected to the pair of wires 5. The first circuit means comprises diode 15, resistor 16 and the contact 11 of relay 9. The second circuit means comprises a diode 13, the energization circuit of a second relay 14 and make contact 12 of relay 9. The diode 15 is poled so that current can flow through the wires 5 in one direction and diode 13 is poled so that current can flow in the opposite direction. Thus, current is allowed to flow in one direction when the called subscriber has not yet released his hookswitch and in the opposite direction when the hookswitch has been released.

It may be seen, therefore, that when a signal, generated in response to the battery 33 being applied to the "M" lead in the calling station, is received in the called station resulting in the "E" lead relay 6 in the called station being energized, relay 9 is energized, connecting the first and second circuit means respectively across the two conductors 5 leading to the local switching equipment.

The well known "E" and "M" signalling system in which this invention has application applies a source of current to the conductors of transmission path 5 in the following manner. The switching station 17 comprises a relay 18 which is responsive to dial pulses of a calling subscriber. A contact 19 on relay 18 is connected in the switching office to further step-by-step switches which are used to identify and connect the called to the calling subscriber. It may be seen that relay 18 comprises two windings, one connected to ground and the other to a battery 20. The other ends of each of the windings on relay 18 are connected to transfer contacts 21, 23, 22, and 24 of relay 25. The transfer contacts are connected to the two wires 5 in such manner as to transpose the connections of the two wires 5 to the two windings of relay 18 when relay 25 is operated. Relay 25 is responsive to circuitry which is activated when the called subscriber lifts his receiver to operate his hookswitch on his telephone set.

Therefore, it may be seen that in my invention, with relay 25 not operated but with the first switching means operated, current flows from ground through battery 20, through one winding of relay 18, through contact 22 of relay 25, through one wire of the pair of wires 5, through contact 11 of relay 9, through resistor 16, through diode 15, through the other wire of the pair of wires 5, through contact 21 of relay 25, through the other winding of relay 18, and back to ground. Therefore, relay 18 will operate.

It is well known that when the calling subscriber dials the digits of the party he wishes to call, ground is alternately removed from and applied to the "E" lead in the called station in correspondence with the digit pulses. Hence it may be understood that in my invention contacts 11 and 12 will be caused to open and close in response to the dial pulses, causing the current flow in wires 5 to be stopped and started and relay 18 to be de-energized and energized in response to each dial pulse. This, as is well known, causes the selector and connector stepping switches in the local switching station to function.

However, should the current in the two conductors of transmission path 5 be flowing in the opposite direction, no current will flow in the former circuit, but current will flow through one conductor of transmission path 5, through diode 13 through switching means 14, through contact 12 of switching means 9, to the other conductor of transmission path 5. Therefore, switching means 14 will operate.

As may be seen in the drawing, capacitors 26 and 27 connected between the terminal equipment and pair of wires 5 allowing the demodulated alternating speech signals to pass to the pair of wires 5 leading to the local switching station but blocking the direct current in pair of wires 5 from entering the terminal equipment.

When the called subscriber releases his hookswitch, relay 25 will operate causing contacts 21 and 22 to break and contacts 23 and 24 to make, reversing the current flow in the pair of wires 5. This causes the current to flow through the second circuit means containing diode 13 instead of the first circuit means containing diode 15. Because the current flow is not significantly interrupted, relay 18 will still remain operated. Also, second switching means shown as relay 14 will operate. Relay 14 comprises a transfer contact 28, 29 which in the inoperative condition has been applying ground through the break springs 28 of the transfer contact 28, 29 to the "M" lead leading to the modulator in the called station terminal equipment. The modulator, while receiving this ground, recognizes in a well-known manner that no special signal is to be sent via transmission path 4 to the demodulator in the terminal equipment of the calling station 1, and hence, as is well known, the "E" lead relay 30 in the calling station will not operate. However, when relay 14 is operated, source of fixed potential 31 is connected through the make springs 29 of the transfer contact 28, 29 to the "M" lead in the called station. The modulator, recognizing this battery, now sends a signal via transmission path 4 to the demodulator in the terminal equipment of the calling station 1 in a well known manner. The demodulator, recognizing this signal, applies a ground to the "E" lead in the calling station, causing the "E" lead relay 30 to be operated through its associated battery 32. Thus the calling station recognizes that the called party has answered his telephone set.

What is claimed is:

In an "E" and "M" telephone supervisory signalling system wherein pulses are applied to an "E" lead at a called station from an interrupted ground corresponding to dial pulses originating at a calling station, and wherein switching equipment at said called station is normally arranged to cause current to flow in one direction in a pair of wires so that a called subscriber's station can be selected in response to interrupted current flow in said one direction corresponding to said pulses, and wherein said switching equipment is arranged to cause current flow in the opposite direction to said one direction in said pair of wires in response to the answering of a call at said called subscriber's station; a conversion circuit at said called station to convert the pulses applied to the "E" lead into said interrupted current flow in said one direction, and to convert said current flow in said opposite direction into a battery supervisory signal applied to the "M" lead at said called station comprising:

(a) first switching means arranged to be alternately operated and released in response to the pulses applied to said "E" lead;

(b) first circuit means connected across said pair of wires arranged to be energized and de-energized in response to the operation and release respectively of the switching means, said first circuit means being further arranged, when energized and de-energized, to permit current to flow, and to prevent current from flowing, respectively, in said one direction in said pair of wires, thereby providing said interrupted current flow;

(c) second circuit means connected across said pair of wires arranged to be energized and de-energized in response to the operation and release respectively of the switching means, said second circuit means being further arranged, when energized and de-energized, to permit current to flow, and to prevent current from flowing, respectively, in said opposite direction in said pair of wires;

(d) and second switching means responsive to current flowing in said opposite direction in said pair of wires to connect a battery supervisory signal to said "M" lead;

wherein said first switching means comprises a first relay arranged to be alternately energized and de-energized by the pulses applied to said "E" lead; the first circuit means comprises a first diode, a resistor and a make contact of said first relay serially connected together across said pair of wires, the first diode being poled so that current is allowed to flow only in said one direction; the second circuit means comprises a second diode, the energization circuit of a second relay and a further make contact of said first relay serially connected together across said pair of wires, the second diode being poled so that current is allowed to flow only in said opposite direction; and said second switching means comprises transfer contacts of said second relay arranged, when said second relay means is energized, to disconnect ground from, and to apply battery to, said "M" lead.

References Cited by the Examiner

UNITED STATES PATENTS

| | | | |
|---|---|---|---|
| 2,366,835 | 1/1945 | Shanck | 179—84 |
| 2,366,837 | 1/1945 | Cory | 179—84 |
| 2,495,725 | 1/1950 | Horwitz | 179—16.4 |

KATHLEEN H. CLAFFY, *Primary Examiner.*

J. JOHNSON, *Assistant Examiner.*